United States Patent [19]

Dickey et al.

[11] Patent Number: 4,936,957

[45] Date of Patent: Jun. 26, 1990

[54] THIN FILM OXIDE DIELECTRIC STRUCTURE AND METHOD

[75] Inventors: John R. Dickey, Dayton, Ohio; Jimmy L. Davidson; Yonhua Tzeng, both of Auburn University, Ala.

[73] Assignee: The United States of America as represented by the Secretary of the Air Force, Washington, D.C.

[21] Appl. No.: 174,063

[22] Filed: Mar. 28, 1988

[51] Int. Cl.$^5$ ............................................. C25D 11/12
[52] U.S. Cl. ................................. 204/37.1; 204/38.3; 204/42; 204/58; 204/228; 204/274
[58] Field of Search ................. 204/58, 42, 38.3, 37.1, 204/228, 274

[56] References Cited

U.S. PATENT DOCUMENTS

| | | | |
|---|---|---|---|
| 2,098,774 | 11/1937 | Coursey et al. | 204/58 |
| 2,376,082 | 5/1945 | Pullen | 204/58 |
| 2,855,350 | 10/1958 | Ernst | 204/58 |
| 3,682,790 | 8/1972 | Orth et al. | 204/58 |
| 3,741,880 | 6/1973 | Shiba et al. | 204/15 |
| 3,971,710 | 7/1976 | Romanikiw | 204/15 |
| 4,045,302 | 8/1977 | Gibbs et al. | 204/15 |
| 4,089,756 | 5/1978 | Lerner et al. | 204/58 |
| 4,130,771 | 12/1978 | Bottom | 310/312 |
| 4,131,520 | 12/1978 | Bernard et al. | 204/42 |
| 4,430,387 | 2/1984 | Nakagawa et al. | 204/42 |
| 4,481,083 | 11/1984 | Ball et al. | 204/38 |
| 4,582,574 | 4/1986 | Nguyen et al. | 204/27 |

OTHER PUBLICATIONS

Lowenheim, *Electroplating*, 1978, pp. 452–478.
R. C. Merrill and R. A. West, Abstract 1, Electrochem. Soc. Extended Abstracts Spring Meeting, Pittsburgh, Pa Apr. 15–18, 1963.
Conference Program, Electrochemical Society Boston MA Springp3 86.
Presentation with Abstract from Electrochemical Society Inc., Boston MA Spring 1986 meeting, May 4–9, 1986.
Masters Thesis, John R. Dickey, Bibliography.

*Primary Examiner*—John F. Niebling
*Assistant Examiner*—David G. Ryser
*Attorney, Agent, or Firm*—Gerald B. Hollins; Donald J. Singer

[57] ABSTRACT

A metallic oxide such as aluminum oxide of significantly improved electrical properties is disclosed. The method of oxide formation includes a combination of soft porous anodization followed by transformation to a hard barrier form of oxide using inter alia low temperature electrolytes, constant voltage anodizing, and timely rate of current change responsive termination of the anodizing process. Use of the resulting oxide in electrical insulation, optic and other environments is contemplated.

58 Claims, 5 Drawing Sheets

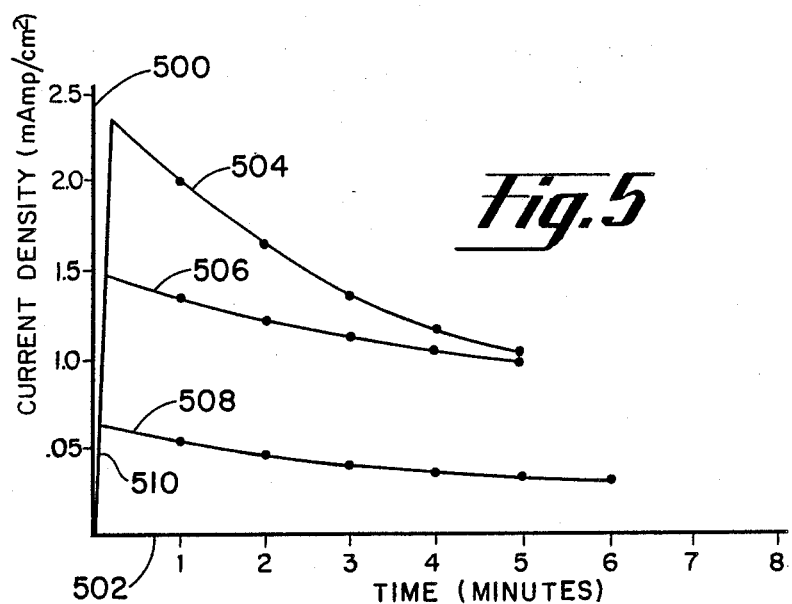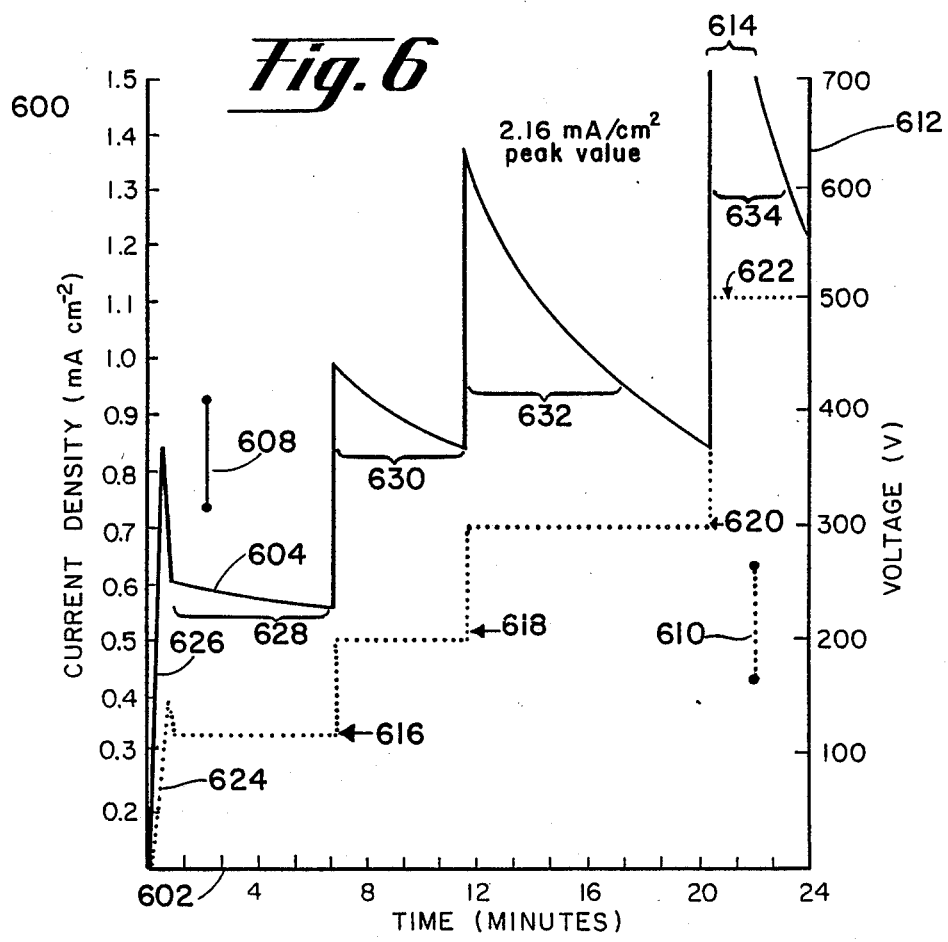

THIN FILM OXIDE DIELECTRIC STRUCTURE AND METHOD

RIGHTS OF THE GOVERNMENT

The invention described herein may be manufactured and used by or for the Government of the United States for all governmental purposes without the payment of any royalty.

CROSS REFERENCE TO RELATED APPLICATIONS

This application is related to a companion application titled ENERGY STORAGE CAPACITOR WITH OXIDE DIELECTRIC, Docket Number AF Inv. 17708B which is filed of even date herewith and which is hereby incorporated by reference herein.

BACKGROUND OF THE INVENTION

This invention relates to the field anodic oxide formation and utilization and especially to anodic oxide used as an electrical insulator.

Dielectric materials are a limiting consideration in improving capacitor energy storage elements. The ability of presently available dielectric materials to provide only small increases in electrical insulation and heat conductivity are notable examples of such limitations. High energy projects in space, as encountered for example in weapons for the strategic defense initiative program, are in particular need of small light weight high energy density capacitors. Energy storage capacitors for space use and also for more conventional uses are of course desirably made to be small in volume, light in weight, of low dielectric power loss, low internal resistance or ohmic loss, small in electrical inductance, have high dielectric breakdown voltage, a low-out gassing rate and have reliability that extends through a period of ten years without replacement or attention. Capacitors of this capability are virtually nonexistent at the present time.

The solid state metal-insulator-metal capacitor, as referred to herein, has characteristics which extend toward the satisfaction of these requirements for space power and for demanding earth applications. When embodied as an aluminum-aluminum oxide-aluminum structure, capacitors of this type can provide electrical energy storage density extending into the range of 18 joules per cubic centimeter of volume, mass in the range of 3.2 grams per cubic centimeter and therefore, energy storage densities in the range of 1,000,000 joules per cubic foot of volume and 400 pounds of weight. These values are based on dielectric constants in the range of 10.0 for the thin film insulation used between capacitor electrodes.

Aluminum oxide produced by anodization, the preferred dielectric material of the present invention, has been shown to have desirable high values of thermal conductivity, relatively light weight and relative low fabrication cost. Two forms of aluminum oxide, are however commonly achieved through anodization, the soft or porous aluminum oxide and the hard or barrier aluminum oxide. Both of these oxides are well known in the metallurgical and capacitor arts and have been the subject of extensive characterization. The former of these oxides, the soft oxide has, in fact, been used for metallic protective coatings since the early 1920's while the latter of these oxides the hard or barrier oxide, has been employed as a dielectric material in electrolytic capacitors also since the early 1900's. Materials of the soft oxide turned hard or of the transformed or converted or densified soft oxide type are related to this barrier form of oxide and are herein shown to be capable of enhancing the state of the capacitor dielectric art.

SUMMARY OF THE INVENTION

The present invention provides for a hard or barrier oxide of superior electrical properties which may be used in capacitors such as energy storage capacitors and which may also find other electrical art uses. The method of oxide fabrication in the invention results in production of this oxide of superior electrical capability in a relatively fast and low cost process that is readily accomplished by knowledgeable modification of existing anodization technology.

It is an object of the present invention, therefore, to provide an anodic oxide material of superior overall electrical properties.

Another object of the invention is to provide an aluminum oxide dielectric material suitable for use in capacitors of enhanced energy storing and delivering capability.

Another object of the invention is to provide an aluminum oxide dielectric material wherein a plurality of different aluminum oxide phases are utilized.

Another object of the invention is to provide an oxide anodization arrangement wherein two different low temperature electrolyte anodizations are utilized.

Another object of the invention is to provide an anodization arrangement wherein a plurality of the anodization parameters are optimized with respect to electrical properties of the formed anodic oxide.

Another object of the invention is to provide a metallic oxide material having a reduced and minimal number of electrical failure initiating sites.

Another object of the invention is to provide an anodic oxidation arrangement wherein the formation of undesirable electrical failure initiating sites is minimized through use of constant voltage anodization.

Another object of the invention is to provide an anodic oxidation arrangement wherein the formation of undesirable electrical property initiating sites is minimized through avoidance of anodizing current fluctuations.

Another object of the invention is to provide an anodization arrangement wherein the termination of anodizing is accomplished in response to predetermined anodizing current waveform characteristics.

Another object of the invention is to provide an anodization arrangement wherein the termination of anodizing current is accomplished in response to the anodizing current attaining a predetermined numeric rate of current change.

Another object of the invention is to provide an anodization arrangement wherein the growth of crystalline oxide forms is minimized.

Another object of the invention to provide a hard anodization cycle in which a tendency toward sample arcing in the electrolyte bath is suppressed by a selected anodization energy waveform.

Another object of the invention is to provide a dielectric structure in which hard anodization oxide is achieved during both a soft porous anodization and a soft oxide transformation anodization.

Another object of the invention is to provide anodization oxide films which may be used as the dielectric element of a capacitor, as an insulating layer in an electronic integrated circuit, as a passivation layer in an integrated circuit, or as an optical energy transmission element.

Another object of the invention is to provide an anodization oxide in which the electrical effects of retained moisture, anodization by-products, and electrolyte components are optimized.

It is another object of the invention to provide an anodization process in which a plurality of processing variables affecting the formation of polycrystalline oxide, of inferior electrical properties, are controlled.

Additional objects and features of the invention will be understood from the following description and the accompanying drawings.

These and other objects of the invention are achieved by a method for generating on a metallic surface an improved anodization oxide, having a smaller number of islands of impaired electrical insulation capability and having increased dielectric strength, which include the steps of commencing the anodization with a smooth and clean metallic surface, generating the anodization oxide in an acidic electrolyte solution of predetermined pH, controlling the temperature of the anodizing bath within a predetermined band of temperatures residing in the range of zero to 15 degrees centigrade, maintaining the anodization voltage at a constant predetermined magnitude and terminating the anodization at a predetermined point of the wave form of anodizing current versus anodizing time.

BRIEF DESCRIPTION OF THE DRAWINGS

FIG. 5 shows a family of current density versus time waveforms descriptive of hard or barrier anodization.

FIG. 6 shows a family of voltage and current density waveforms relating to an alternatively arranged hard or barrier anodization sequence.

DETAILED DESCRIPTION

Figure 1:
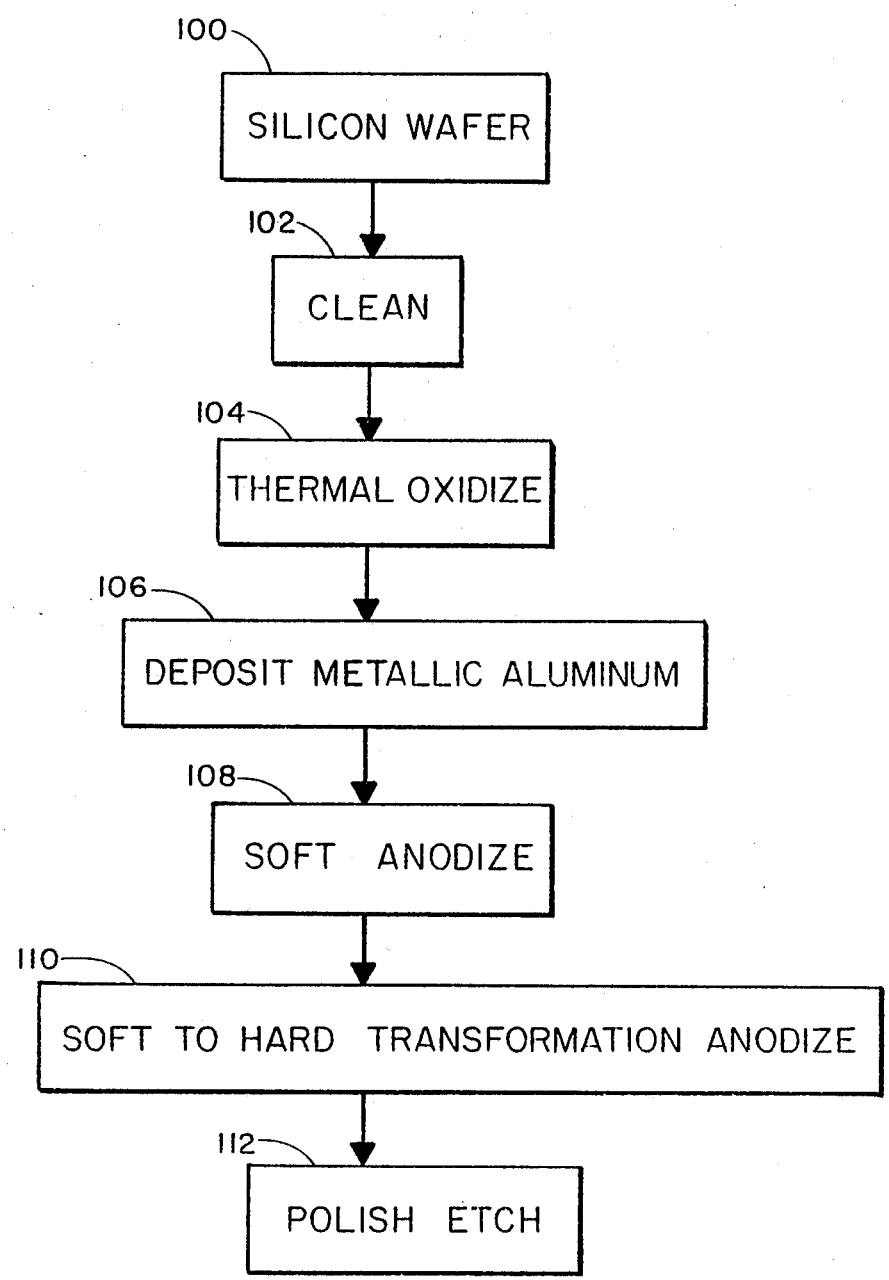
FIG. 1 shows an anodization method according to the invention.
Figure 2:
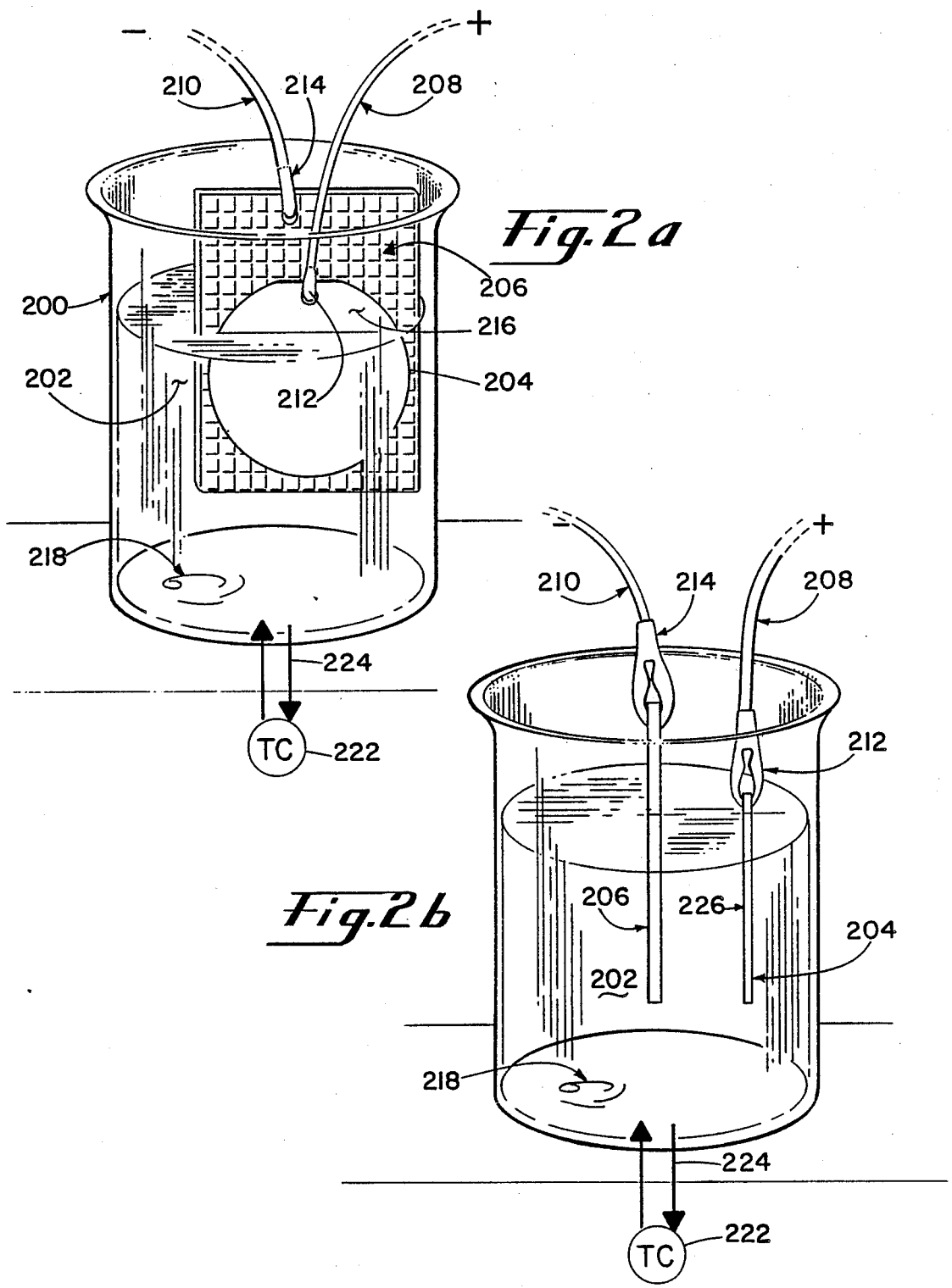
FIG. 2 a and b shows a simplified version of an anodizing apparatus according to the invention.

The combination of FIG. 1 and FIG. 2 in the drawings describe an anodization process for achieving metallic oxide coatings of superior electrical performance capability. The block diagram of FIG. 1 describes the salient processing steps comprising the anodizing method, the steps in FIG. 1 being identified with the numbers 100 through 112. FIG. 2 shows a small sample or laboratory type apparatus for accomplishing the processing steps shown in the FIG. 1 diagram.

FIG. 2, more precisely, shows two views identified as FIG. 2A and FIG. 2B, of a beaker anodizing arrangement. The FIG. 2 apparatus includes a beaker 200 which contains an anodizing electrolyte 202, a metallic wire-mesh cathode 206, and a workpiece 204 which has a surface that is to be anodized. The FIG. 2 apparatus also includes anode and cathode electrical leads 208 and 210 which are connected to the anode and cathode electrodes via a pair of spring clips 212 and 214, and a clip attachment area 216 on the workpiece 204. The FIG. 2 apparatus includes an electrolyte stirring element 218 which is presumed to be magnetically coupled to a source of rotational energy located below the beaker 200 but not shown in FIG. 2. Also shown in FIG. 2 is a temperature controlling apparatus 222 by which heat is extracted or added to the electrolyte 202 as indicated by the inward and outward directed arrows 224 in order to maintain the electrolyte and the anodizing process at a selected temperature.

The cathode 206 in the FIG. 2 apparatus is preferably made from a platinum wire-mesh, and the workpiece 204 is typically illustrated in the form of a silicon wafer that is coated on the side to be anodized with a film of metal such as aluminum. The source of rotational energy for the stirring element 218 may be a commercially manufactured apparatus such as the Corning type PC101 Hot Plate/Stirrer.

In FIG. 1 the salient steps in an anodization process according to the present invention include commencement with the silicon wafer - indicated by the block 100 in FIG. 1, cleaning of the wafer as indicated by the block 102, - using a process such as the Huang clean which is known in the art for example, thermally oxidizing at least the wafer surface which is to be anodized as indicated by the block 104, and deposition of a metallic film such as aluminum onto the oxidized wafer surface as is indicated by the block 106. The electrolytic anodization steps are indicated by the blocks 108 and 110 in FIG. 1. Each of these anodization steps involves apparatus of the type shown in FIG. 2 of the drawings. The last step in a FIG. 1 related sequence the polishing etch indicated by the block 112, especially relates to situations in which some of the FIG. 1 steps are to be repeated in order that a multiple layer structure be achieved.

Additional details concerning the blocks in FIG. 1 are recited below, these details are especially concerned with the anodization steps of blocks 108 and 110 as these steps are accomplished in apparatus of the FIG. 2 type. By way of illustration, the FIG. 1 and FIG. 2 drawings are herein described with principal reference to the anodization of metallic aluminum as would be desirable, for example, in the formation of dielectric material for use in electrical capacitors, especially energy storage capacitors having significantly larger energy storing capability for each unit of capacitor mass or capacitor volume. Other uses of the described aluminum anodization process, uses other than in an electrical capacitor, and indeed anodizations of metals other than aluminum will, of course, be apparent to those skilled in the art.

In perspective the fabrication of aluminum oxide materials has become a finely tuned but somewhat static art. Generally, aluminum oxides are classified as being either of the soft porous nature, e.g. oxides such as are employed for corrosion protection, color impartation (e.g. multiple colored aluminum beverage vessels and coasters), and for architectural coloring and weather protection as in window frames and space filling panels of building; and oxides that are classified as the hard or barrier aluminum oxides which find application as electrical insulation especially in capacitors. Most previous work with barrier anodic aluminum oxide has been concerned with films under 1000 angstroms in thickness with a few instances of films of thickness up to 1 micron. Especially in recent efforts, however, such films have been principally investigated for use in the zero to 20 volt electrical potential environment—i.e., in the voltage range used in integrated circuit application.

Barrier aluminum oxide has relatively high thermal conductivity; conductivity values of 30 W/K-m are to be found in comparison with values of 1.6 W/K-m for porcelain or 0.35 W/K-m for paper-based laminate. This oxide is, therefore, a desirable insulating material for energy storage capacitors wherein high rates of charge and discharge produce significant capacitor energy loss and localized heating. Locally generated heat must, of course, be dissipated through the electrodes and dielectric in most practical capacitor arrangements.

One aspect of the present invention, therefore contemplates the formation of oxide material such as anodization aluminum oxide having desirable thermal and other properties. The formed oxide is produced in an unconventional manner and is believed to provide an unconventional oxide structure which achieves superior electrical properties. As described in greater detail subsequently herein, the combination of a soft or porous anodization step followed by barrier or hard anodization of the resulting porous soft oxide is found to achieve electrical properties which are in the range of or in excess of the properties of an oxide film of the same thickness accomplished by an exclusively hard anodization. The film achieved in this manner, which is herein referred to as a soft/hard oxide can moreover be improved significantly with respect to the absence of certain imperfections or flaws that are frequently encountered in thin film oxides. The soft/hard anodization when applied to aluminum, as described herein, is believed to result in the presence of several of the recognized nine different phases of aluminum oxide. According to the present invention, aluminum anodized oxides having dielectric constants up to the range of 70.0, for a secondary or tertiary layer capacitor in a multilayer device, resistivities of $1.2 \times 10^{18}$ ohm—centimeter, and breakdown voltages up to 2.38 times the hard anodize forming voltage are achieved. The following examples in connection with FIGS. 1 and 2 herein describe the process.

EXAMPLE I

Referring now to the FIG. 1 process, a silicon wafer, a wafer of silicon that is phosphorus doped to a resistivity level of 1.0 ohm—centimeter in the 100 orientation may be used as a substrate for oxide formation.

The silicon wafer is indicated at block 100 in FIG. 1; cleaning of this wafer is indicated at block 102 in FIG. 1. A film of thermally formed oxide is grown on the clean surface of the wafer as is indicated at block 104 in FIG. 1, this oxide may have a thickness of between 4000 Angstroms and one micron for example. Onto this thermally oxidized wafer surface is sputtered a 1.0 micron thick layer of metal such as aluminum—of 99.99% purity as is indicated by the block 106 in FIG. 1, an electron beam evaporator may be used for this operation.

Figure 4:
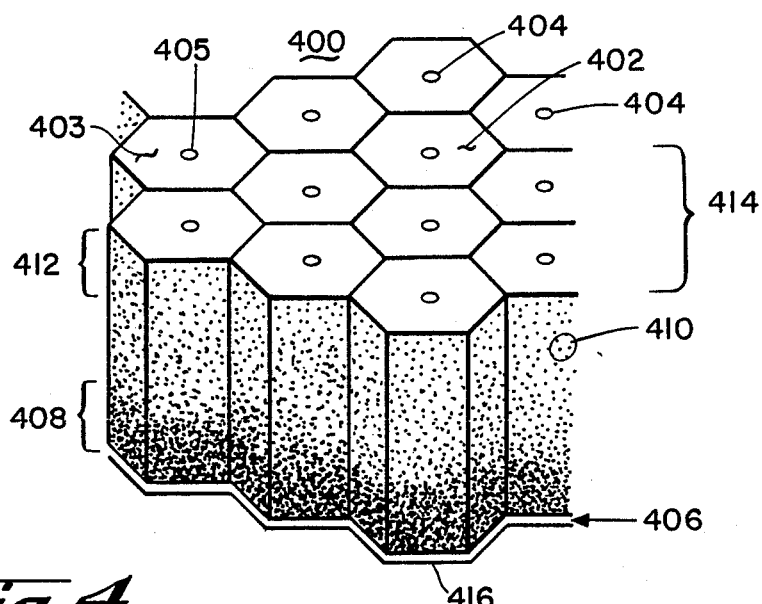
FIG. 4 shows a simplified perspective cross section of a porous anodization layer together with relative ion concentrations occurring during anodization.

Soft or porous anodization of the aluminum is indicated at 108 in FIG. 1 and is accomplished in a sulfuric acid electrolyte bath in an apparatus such as is shown in FIG. 2 of the drawings. The acid bath is maintained at 6 degrees centigrade; temperature maintenance is provided by the temperature control apparatus indicated at 222 in FIG. 2 which may comprise a melting ice solution or a refrigeration apparatus—anodization being an exothermic reaction. The sulfuric acid electrolyte is comprised of concentrated $H_2SO_4$ diluted 1 to 10 by volume with deionized water. During the soft anodization, a current of 1.5 milliamperes per centimeter squared of workpiece surface is maintained. The soft or porous anodization is continued until the approximate desired final film thickness is obtained. A porous oxide film that is 6000 Å thick requires nine minutes of anodizing time. This film can be expected to comprise a hexagon cell with central pore structure as illustrated in FIG. 4 herein and to include an approximate pores per square inch count according to Table 1 below.

TABLE 1

| Electrolyte | Forming Voltage | Pores/in$^2$ ($\times 10^9$) |
|---|---|---|
| $H_2SO_4$ | 15 | 498 |
|  | 20 | 334 |
|  | 30 | 179 |

Selection of the constant anodizing current, the current specified at 1.5 milliamperes per square centimeter in the present Example I, will result in the 15, 20, and 30 volt levels recited in Table 1.

Figure 3:
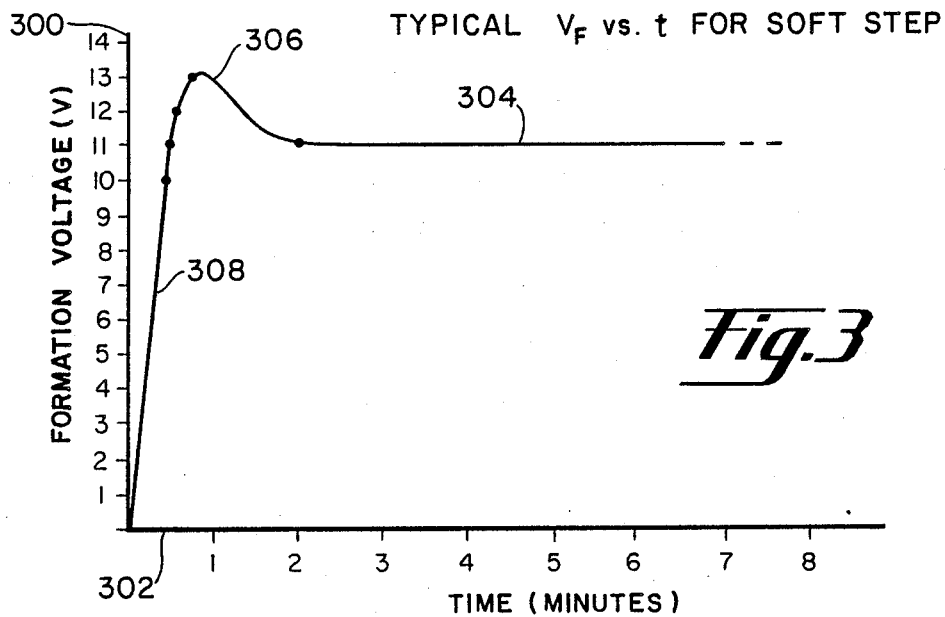
FIG. 3 shows a typical waveform of voltage versus time for a soft or a porous anodization.

The constant current used for the soft anodizing of this example will result in an anodizing voltage waveform of the type shown in FIG. 3 of the drawings. The FIG. 3 voltage waveform includes a relatively short rise time portion 308, and an overshoot peak 306 which are followed by a substantially constant voltage portion 304 which continues until all of the metallic aluminum is anodized or the anodization is terminated. Typical values of voltage level and anodizing time are shown on scales 300 and 302 of FIG. 3.

The soft oxide film pores—of the type indicated at 404 in FIG. 4 will act to retain moisture and electrolyte to a degree which is undesirable for electrical insulation or dielectric use of the oxide. A number of different approaches to preventing this problem are possible. The pores represented in FIG. 4 may, for example, be sealed by a 15 to 25 minute boiling of the soft porous oxide. Boiling provides oxide conversion from the amorphrous oxide to a monohydrate boemite and/or trihydrate bayerite with increased volume and pore closure. The pores may also be sealed by the polymer sealing techniques which is known in the art.

Although it is not shown in the FIG. 1 flow diagram, it is preferable that the oxide formed during the soft anodization of block 108 be washed in deionized water and air dried prior to the soft/hard anodizing of the next FIG. 1 processing step.

In the hard or barrier anodization of block 110 in FIG. 1, the soft porous oxide is transformed or densified into a hard or hardlike oxide that is characterized by electrical properties superior to an equivalent thickness of conventional hard oxide. Hard or barrier anodization, hereinafter the hard anodization, may also be accomplished in an apparatus of the type shown in FIG. 2.

The electrolyte for hard anodization may consist of a boric acid solution having 3% by weight of powdered $H_3BO_3$ received in de-ionized water. The hard anodize electrolyte is preferably of limited free water availability, as is attained by a 1 to 20 dilution of the electrolyte with ethylene glycol. The pH of the hard anodize electrolyte is preferably adjusted to 5.0 by titration with ammonium hydroxide ($NH_4OH$). The combination of boric acid and ethelene glycol has been shown to have a secondary desirable effect in that great cavity current efficiency is attainable with the combination.

A constant anodizing voltage is preferred for the hard anodization, this voltage is set at a value of 200 volts for the present example. The current density to be expected from a 200 volt hard anodization bias and its time related behavior are indicated by the characteristic 508 in FIG. 5. The hard anodization is also accomplished at a temperature of 6 degrees centigrade.

The hard anodization is preferably controlled as to time duration in order that oxide of desirable electrical characteristics be obtained. This control, in practice, involves the avoidance of undesirable characteristics in the anodization process and may, for example, be accomplished by terminating the anodizing bias or forming voltage in response to a decrease in anodizing current. More precisely, this termination is related to the attainment of a predetermined rate of current decrease in the anodizing current. It is especially desirable for anodizing to be terminated before the anodizing current falls into a region of instability or fluctuation since continued anodizing in this region is found to also contribute to the formation of undesirable polycrystalline oxide. The sensing of a predetermined rate of current change is a convenient arrangement for excluding anodization in this region of instability. In the present example, anodization bias is therefore preferably, removed when the rate of change of anodizing current falls to a level of 0.025 milliamperes per square centimeter per minute.

The formation of partially polycrystalline aluminum oxide is also found to be retarded by the presence of electrolyte byproducts in the formed barrier anodic films.

FIG. 4 in the drawings, which was referred to briefly above, is illustrative of events occurring in the hard anodized portion of the soft/hard process. In FIG. 4, a greatly magnified schematic representation of a soft porous anodization layer is shown at 400 with individual cells of the layer being indicated at 402 and 403 and with pores within the cells 402 and 403 being indicated at 404 and 405. The small region of oxide shown in FIG. 4 is, of course, continued laterally in all directions as is indicated at 414 in FIG. 4. The relative concentration of metal ions, e.g. aluminum ions during a hard anodization is indicated at 410 in FIG. 4, this ion concentration is greatest in the metal film adjacent portion of the FIG. 4 oxide layer as is indicated at 408 and is lesser in intensity in the metal film distal region of FIG. 4—as is indicated at 412. The surface of the underlying metal or aluminum film is indicated at 416 in FIG. 6; a layer of hard oxide, which is also found to form during the described soft porous anodization, is indicated at 406 in FIG. 4.

Transformation, conversion, or densification of the soft porous oxide shown in FIG. 4 occurs first at the bottom of the soft oxide layer, in the region 408, for example, because of the larger concentration of metal ions, $Al^{+++}$ ions, in this lower region adjacent to the metallic surface 416. Transformation progresses upward in the FIG. 4 representation as the region of higher $Al^{+++}$ ion density rises. In the hard anodization, free $Al^{+++}$ ions combine with $O^{--}$ ions to form $Al_2O_3$. These areas of highest $Al^{+++}$ concentration have greatest 'pull' on $O^{--}$ ions and therefore tend to 'transform' to 'hard' $Al_2O_3$ first.

Ambient humidity and electrolyte temperature are found to influence the anodizing current density during the hard anodization step. Both low temperature and high humidity tend to suppress the magnitude of the current density. A low temperature pre-hard anodization bake of the soft porous oxide can be used to exclude humidity effects.

If a hard anodize forming voltage that is more than sufficient to transform the entire soft oxide film is employed, then the layer of initially formed hard oxide changes from a slow growth mode existing during a soft to hard transformation to a more rapid growth mode. A large variety of combinations of soft and hard anodizing conditions can be combined to form a compound dielectric structure having varying physical, dielectric and even optical properties.

For performing the constant current soft anodizing, a power supply such as the Hewlett-Packard type 6218B supply has been found to be satisfactory. A supply such as the Ephortek 3KV power supply may be used for the constant voltage hard anodizing. Table III below describes the oxide physical properties obtained from the soft/hard anodization of the present example, together with the properties attained in other soft/hard anodization processes using a 200 volt hard anodization voltage.

TABLE III

| # | $J_s$ | $V_m$ | $T_a$ | C | $V_h$ | $J_{mh}$ | $T_h$ | $C_h$ | t | S |
|---|---|---|---|---|---|---|---|---|---|---|
| A | 1.5 | 13.7 | 9 | 17.1 | — | — | — | — | 6000 | 1.8 |
| B | 1.5 | 13.7 | 9 | 17.1 | 200 | .612 | 6 | 2.9 | 6900 | 1.9 |
| C | 1.5 | 12.5 | 1 | 1.8 | 200 | .443 | 4 | 1.6 | 3050 | 1.7 |
| D | 1.5 | 13.1 | 3 | 5.4 | 200 | .421 | 5 | 1.7 | 3250 | 2.0 |
| E | 1.5 | 13.0 | 5 | 9.0 | 200 | .450 | 5 | 1.9 | 4700 | — |
| F | 1.5 | 13.2 | 7 | 12.6 | 200 | .416 | 6 | 2.1 | 7100 | 2.0 |

\# = sample identification
$J_s$ = soft J (mA cm$^{-2}$)
$V_m$ = soft Vmax (V)
$T_a$ = soft anod. time (min)
C = soft coulombs (C)
$V_h$ = hard voltage (V)
$J_{mh}$ = hard Jmax (mA cm$^{-2}$)
$T_h$ = hard anod. time (min.)
$C_h$ = hard coulombs (C)
t = thickness (Angstroms)
S = swell factor In Table III, the samples are identified with letters between A and F in the first column. Properties relating to the soft anodization are shown in the next four columns, properties relating to the hard anodization are shown in the next four columns and properties relating to the completed soft/hard anodization oxide are shown in the last two columns. The soft anodization information shown in Table III includes the anodizing current density, $J_s$, the maximum attained anodizing voltage under constant current conditions, $V_m$; the soft anodization time, $T_a$; and the number of coulombs, C of electrical charge delivered to the electrodes. For the hard anodization, the selected voltage, $V_h$, is shown along with the maximum current density, $J_{mh}$; the time of hard anodization, $T_h$, and the coulombs of charge, $C_h$, delivered to the electrodes during hard anodization. In the last two columns of Table III, the overall thickness, t, of the attained anodic oxide is shown along with the swelling factors, of the attained oxide over the thickness of the anodized aluminum the symbols used in Tables III and in Tables IV and V below are applicable to the table information only and are not symbols accepted in the art.

Sample A in Table III is subjected only to soft anodization and, therefore, can be expected to have inferior electrical properties with respect to the other samples in this table. A 200 volt hard anodizing is used for the samples in Table III. As shown by the time column in Table III, variations of the hard anodizing time between 4 and 6 minutes are used to obtain a variety of film thicknesses as indicated by the data in the swell factor column of Table III; most of the swelling occurs during soft anodization.

Table IV shown below indicates the dielectric properties obtainable from soft/hard aluminum oxide films. The three samples of Table IV, samples A, B, and C, are unrelated to the samples in Table III but serve to indicate the range of dielectric properties obtainable with the soft/hard anodization of the present examples.

TABLE IV

| sample | $D_c$ | $V_{bd}$ | $R_5$ | $E_r$ | $D_F$ |
|---|---|---|---|---|---|
| A | 18.15 | 54 | .42 | 12.3 | 1.3 |
| B | 17.40 | 475 | 7.00 | 16.8 | 0.5 |
| C | 20.80 | 620 | 8.60 | 17.2 | 0.9 |

$D_c$ - cap. density (nF cm$^{-2}$)
$V_{bd}$ - breakdown voltage (V)
$R_5$ - resist. @ 5 V (ohm cm × 10$^{12}$)
$E_r$ - rel. permittivity ($E_r$)
$D_F$ - DF @ 1 kHz (%)

Sample A received soft anodization only; Samples B and C received both soft and hard anodization—the latter at the 200 volt and 400 volt levels respectively.

A General Ratio Corporation type 716B capacitance bridge may be used in measuring the overall capacitance from which capacitance density is computed and the dissipation factor reported in the first and last columns of Table IV.

A test voltage, ramped at the rate of 2 volts per second to the point of destructive breakdown, may be used in measurement of the breakdown voltage reported in Table IV. It is notable that the breakdown voltages reported in Table IV are up to 2.38 times the hard anodizing voltage employed during fabrication of the sample. This 2.38 relationship is demonstrated by Sample B in Table IV where 475/200=2.38. This breakdown voltage to anodizing voltage relationship is especially notable in view of the prevailing anodic film art wisdom that breakdown voltages at or below the anodizing voltage are to be expected in an aluminum oxide dielectric material. In the present instance the dielectric breakdown fields behave as if the soft/hard oxide was instead a high quality amorphous, barrier oxide. Contrary to the behavior of conventionally anodized hard oxide, the capacitance density and dissipation factor are better at high frequencies for the oxide of the invention.

In a 7,000 Angstrom thick sample of soft/hard oxide according to the present example, breakdown fields in the range of 8.86 megavolts per centimeter are to be expected; these measurements are made with a sputtered Al counter-electrode. Such breakdown fields are up to twice those previously attained with other anodizing arrangements.

The dissipation factor achieved with soft/hard dielectric material is higher at low frequencies, e.g. value near 0.5 at 1 kilohertz falling to about 0.2 at 10 kilohertz and rising slightly to about 0.22 at 100 kilohertz. Unbaked samples of the soft/hard oxide show higher dissipation factors at low frequencies but exhibit a rapid decrease to values similar to the baked film at frequencies above 10 kilohertz. Capacitance density achieved with the soft/hard dielectric material increases with frequency, for example, values near 16 nanofarads per centimeter squared are found at 10 kilohertz with these values increasing to about 18.25 nanofarads per centimeter squared at 100 kilohertz.

Direct current resistance characteristics of the soft/hard anodization films have achieved values up to 1.28 E 18 ($1.28 \times 10^{18}$) ohm-centimeters at voltages of 17% of the forming potential. In view of the commonly achieved values of DC resistance in oxides which fall between 10E 11 and 10E 17 ohm-centimeters, these values are notable. Additionally, however, most prior resistance measurements are made at voltages less than 5% of the forming potential of the oxide and large increases in resistance values are to be expected with decreases in measuring potential.

Variations in the soft/hard oxide film dissipation factor with humidity exposure are also observed. Following three months exposure to 50% relative humidity, dissipation factors of 8% or more at 1 kilohertz, 0.75% at 10 kilohertz, and 0.75% at 1 megahertz are encountered with reductions to below 1% from 100 hertz to 1 megahertz following a 250° C. bake for four hours. Baking temperatures below the deposition temperature of the original aluminum film should be used in this bake in order to avoid the formation of hillocks which can push through the oxide layer.

Healing of the formed oxide by the application of a gradually increasing DC voltage across the dielectric until the occurrence of a sudden-jump in current followed by a very low level of current has also been observed. Such properties are commonly experienced with dielectric materials in the capacitor industry.

EXAMPLE II

The cleaned and oxidized silicon wafer recited in Example I is sputter coated with a film of aluminum of 99.99% purity having a thickness of 10,000 Angstroms for this example. Increased purity of the aluminum film from 99.99% to 99.999% has been shown to have a dramatic impact on the dielectric strength of the anodization oxide formed - dielectric strength increases from 6 KV/mil to 9 KV/mil as a result of this change in aluminum purity are possible.

A native oxide film near 50 Angstroms of thickness is presumed to exist on the surface of the aluminum in the present example. In a normal dry oxygen atmosphere, aluminum of the recited purity will quickly acquire a layer of native oxide of this thickness. The soft anodization of block 108 is accomplished in the present Example II using a sulfuric acid electrolyte in exactly the manner specified for Example I above. In the present example, the soft porous anodized layer is washed in dionized water and baked at 80°–100° C. Removal of excess moisture is found to increase the anodizing current density. The native oxide film is usually dissipated in the acidic electrolyte of the soft anodization.

The hard anodization of the present example is accomplished using a constant anodizing voltage of 300 volts. The hard anodization termination specified for Example I above is also used in the present Example II. A current density versus time relationship as shown typically by the curve 506 in FIG. 5 of the drawings is to be expected during a 300 volt hard anodization. Numeric values of current density and time typical of such anodization are shown along the scales 500 and 502 in FIG. 5. A post hard anodization bake is employed in the present Example II in order to eliminate instabilities in the electrical bulk resistivity of the hard anodize film. Such instability is responsive to a post anodization annealing (e.g. 200° C. for 24 hours) and is possibly due to further film formation and absorbed water expulsion. Post anodized baking of the hard oxide also has a significant beneficial effect on the measured dissipation factor of the oxide film. The increased anodization forming voltage of the present example can also be expected to decrease the dissipation factor of the formed oxide by about 12%.

Figure 7:
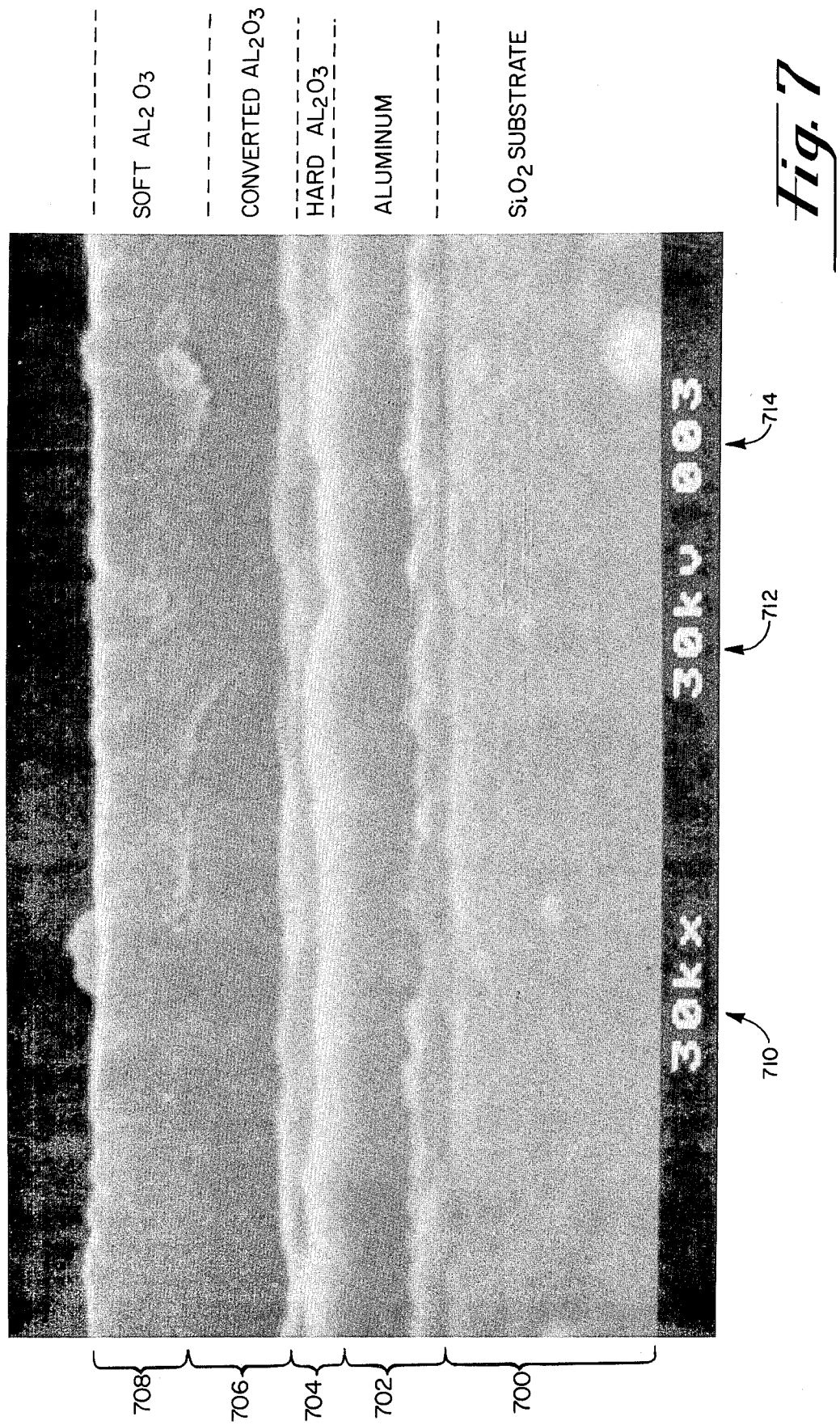
FIG. 7 shows a magnified cross section of anodization films according to the invention.

A cleaved sample scanning electron microscope cross-sectional view of the structure resulting from anodization according to this Example II processing is shown in FIG. 7 of the drawings. In FIG. 7, the layer 700 represents the oxidized silicon substrate, and the layer 702 is the 99.99% purity aluminum overlaying this substrate. The anodizing layers are shown at 704, 706, and 708 in FIG. 7.

The anodizing layer at 704 in FIG. 7 is a thin layer of hard aluminum oxide which forms during soft anodization of metallic aluminum; this layer commences during soft anodization and grows in thickness during hard anodization. The layer of material converted from soft to hard aluminum oxide is indicated at 706 in FIG. 7 while a layer of unconverted soft oxide is shown at 708 in FIG. 7. As indicated at 710 along the bottom edge of FIG. 7, the cleaved cross-section of this figure is magnified 30,000 times. A SEM accelerating potential of 30,000 volts is used for the FIG. 7 representation as shown at 712 and the illustrated microphotograph is the third photograph in the instant numbering series as is indicated at 714.

Several aspects of the FIG. 7 cleaved cross-section microphotograph are notable; these include location of the converted aluminum oxide layer in close adjacency to the metallic aluminum film. Also notable in FIG. 7 is the incomplete conversion of aluminum in the layer 702 into aluminum oxide. Such incomplete conversion is, of course, desirable where a layer of unconverted metal is to form one electrode of a capacitor using the oxide layers 704, 706 and 708, as a dielectric element. The incomplete conversion of soft aluminum oxide into hard barrier oxide is indicated by the presence of the layer 708 in FIG. 7.

In the present example, the 300 volt hard anodizing, the high purity aluminum and the post anodizing baking all tend to increase the dielectric performance of the anodization oxide. Dielectric breakdown voltages in the range of 2.0 times the hard anodization forming voltage are to be expected with the condition specified in this example.

EXAMPLE III

In this example the clean thermally oxidized silicon wafer of blocks 100, 102 and 104 in FIG. 1 is sputter deposited with 99.99% pure metallic aluminum as in Example I above and is subjected to block 108 soft anodization using a sulfuric acid electrolyte bath.

In this example, the soft to hard transformation anodizing of block 110 in FIG. 1 is accomplished as recited in Example I above except for the use of a 500 volt anodizing potential. A current density versus time relationship as known typically by the curve 504 in FIG. 5 of the drawings is to be expected during a 500 volt hard anodization. Numeric values of current density and time typical of such an anodization are shown along the scales 500 and 502 in FIG. 5.

A 500 volt anodizing potential together with the hard anodization termination criteria of Example I is sufficient to convert approximately 3500 Angstroms of the soft oxide as well as to increase the thickness of the initial hard oxide layer to approximately 1400 Angstroms in this example. If the soft anodization was allowed to progress only to the point of maximum soft anodizing potential in this example, an event usually requiring less than one minute of anodizing time, then the hard anodization potential of 500 volts as used in the present Example III, is found to create at least one micron of hard or hard-like oxide. Table V below shows the results of a 500 volt hard anodizing potential in the manner of Table III above.

TABLE V

| # | $J_s$ | $V_m$ | $T_a$ | C | $V_h$ | $J_{mh}$ | $T_h$ | $C_h$ | t | S |
|---|---|---|---|---|---|---|---|---|---|---|
| A | 1.5 | 13.7 | 9 | 17.1 | 500 | 1.480 | 5 | 7.2 | 7300 | 1.3 |
| B | — | — | — | — | 500 | 1.820 | 10 | 15.5 | 4850 | 1.0 |

# = sample identification
$J_s$ = soft J (mA cm$^{-2}$)
$V_m$ = soft Vmax (V)
$T_a$ = soft anod. time (min)
C = soft coulombs (C)
$V_h$ = hard voltage (V)
$J_{mh}$ = hard Jmax (mA cm$^{-2}$)
$T_h$ = hard anod. time (min.)
$C_h$ = hard coulombs (C)
t = thickness (Angstroms)
S = swell %

The symbols used in Table V above are also applicable to the table information only and are not symbols accepted in the art.

In Table V, Sample B shows the results of a 500 volt hard anodization without a preceeding soft anodization and with the anodizing employing a large number of coulombs and a long anodizing time. When anodizing oxygen is formed under the conditions described for sample B, oxide growth limits based upon the forming voltage used and falling between 12 Angstroms per volt and 15 Angstroms per volt are to be expected - depending primarily on the choice of electrolyte and temperature. Since capacitance density varies with the forming voltage of the hard oxide dielectric materials used in a capacitor and this variation is exponential in nature, the oxide of the present example will provide lower capacitance per unit volume in a capacitor. Typical capacitance density vs hard anodize forming voltages shows a value near 90 nf/cm$^2$ at a 100 volt forming potential, 30 nf/cm$^2$ at 150 volts, 15 nf/cm$^2$ at 250 volts and 10 nf/cm$^2$ at 400 volts.

EXAMPLE IV

In this Example, the steps of blocks 100, 102, 104, 106, and 108 in FIG. 1 are performed as in Example I above. These steps include a sulfuric acid electrolyte during the soft anodization of block 108. For the soft to hard transformation anodizing of block 110, the boric acid/glycol solution is used.

Hard anodize termination in response to attaining a predetermined rate of change of anodizing current is also employed in this example. The hard anodizing voltage for this example, in lieu of being maintained at a constant value is stepped in the manner indicated for the wave form 606 in FIG. 6 of the drawings. This stepped voltage provides an anodizing current wave of the type shown at 604 in FIG. 6. FIG. 6, therefore, shows a family of anodizing waveforms which may be employed during hard anodization, waveforms which are especially useful in avoiding the occurrence of arcing on the face of the sample in the electrolyte bath.

In FIG. 6, numbers along the left hand axis, 600, indicate anodizing sample current density in milliamps per square centimeter, numbers along the right hand axis, 612, represent anodizing voltage and numbers along the horizontal axis, 602, represent anodizing time in minutes. The left hand axis numbers relate to the waveform 604 as is indicated by the identifier 608 and numbers along the righthand axis 612 relate to the waveform 606 as is indicated by the identifier 610. The relatively fast rise time of anodizing voltage and current (as shown as 624 and 626 in FIG. 6), is desirable in order to assure minimum anodizing during the condition of intermediate current flow—flow wherein polycrystalline oxide formation tends to occur.

The four different voltage levels applied to the anodizing apparatus are indicated at 616, 618, 620 and 622 in FIG. 6, and in the present example are selected to be approximately 100, 200, 300 and 500 volts in magnitude. As indicated by the exponential current waveforms at 628, 630, 632, and 634 in FIG. 6, each increase in the anodizing voltage level results in a new exponential curve of anodizing current. Termination of the hard anodizing in response to attaining a predetermined rate of decrease in the waveform 604 is yet appropriate in the FIG. 6 anodizing environment notwithstanding the step nature of the applied anodizing voltage. Anodizing termination at the intermediate voltage levels 616, 618, and 620 by an incorporated current sensing circuit can be avoided by appropriate selection of the time duration at each of the intermediate voltage levels to maintain the current and its rate of change outside of the termination condition. The gap in the waveform 604, shown at 614, is present for drawing convenience; the omitted peak of the waveform 604 at the gap 614, is, of course, similar to the other peaks in this waveform excepting for the slope and curvature indicated by the curve portions present.

A principal advantage in the use of stepped anodizing voltage, as shown in FIG. 6, resides in the ability of such voltage to attain a desired higher anodize finishing voltage with the attendant enhancement of oxide dielectric properties. The lower voltage part of this waveform avoids the physical damage and oxide defect regions that are conducive to formation of polycrystalline oxide and oxide voids associates with degraded dielectric performance while the higher voltage part of the waveform achieves the enhanced dielectric properties—dielectric properties which are determined by the magnitude of the anodize forming voltage.

Hard anodization voltage stepping is especially useful on secondary or tertiary layers in a multilevel capacitor structure. Breakdown potential, again, exceeds the maximum hard anodizing potential when voltage stepping is used. The data in Table V above is applicable.

Breakdown in a FIG. 6 anodization appears to be determined by overall oxide thickness as well as by the oxide forming potential - for this reason, a layer of e.g. 6500 Å thickness may be hard anodized at 200 volts and have a breakdown capability of 475 volts (for a factor of 2.3) while a layer of e.g. 7000 Å thickness which was hard anodized at 500 volts might have a breakdown capability of 620 volts for a factor of just 1.25.

A voltage stepping anodization approach for a single layer capacitor will probably result in slightly superior breakdown results in comparison with a hard anodizing approach but is most likely to be beneficial when it is desired to achieve higher hard anodizing voltages—anodizing voltages of e.g. 1-2 KV.

The dielectric characteristics of a stepped voltage oxide can be expected to be similar to those associated with soft/hard oxide formed without voltage stepping or slightly better.

EXAMPLE V

By way of comparing the method and results of the present invention, including the above four examples which are in accordance with the invention, with the commonly practiced anodization and its results, the present example involves aluminum anodizing according to the conventional or prevailing anodize oxide arrangement.

According to this prevailing anodize oxide arrangement, anodization is performed at some temperature well below room temperature using a tartaric acid electrolyte. The tartaric acid is diluted one to twenty by volume with water and buffered to a pH of 6.0 with weak non halide—ion forming base such as methylamine. Ethylene glycol and other free water limiting agents are omitted for this example.

A single anodization forming of a unitary layer of hard or barrier aluminum oxide is performed.

The anodization of this example is accomplished with an initially constant anodizing current with current control achieved through the use of a Variac® or other current and voltage varying apparatus. Upon attainment of the predetermined desired anodize forming voltage, the anodization is continued to its termination under constant voltage conditions with decreasing current density. Anodization maintains for a time between fifteen and forty five minutes and results in an oxide thickness less than ten thousand angstroms.

The aluminum oxide resulting from this anodization will exhibit a breakdown voltage characteristic that is between seventy five and ninety percent of the constant forming voltage, achieve a relative permativity of 8 to 12 at frequencies in the 100 to 50,000 hertz range and have a dissipation factor in the range of 1.1 to 1.7 percent at room temperature. Positive correlation of dissipation factor with the frequency of the applied voltage occurs. A capacitor fabricated with this oxide will show capacitance decrease with increasing frequency at frequencies above eighty kilohertz. The specific resistivity of oxide formed in this manner will be in the 3 E 14 to 1 E 16 range for temperatures in the two hundred degree to zero degree celsius range.

Appendix

The use of constant voltage rather than constant current energizing in the hard anodizing steps of the above first four examples contributes significantly to the improved electrical performance of the anodization oxide achieved. In addition to such constant voltage hard anodizing, a number of other considerations are influential on the electrical properties of the achieved thin oxide films; these considerations include the following:

1. The presence of a thoroughly clean wafer prior to aluminizing is desirable to avoid weak spots and ruptures in the anodize film. Any surface irregularities in the metallic aluminum film will cause field intensifications during anodization and during use of the anodize dielectric material and thereby present sites of more likely electrical breakdown.

2. The growth of oxide on (100) oriented aluminum substrate grain is found to provide thicker and less crystalline oxide than does oxide grown on other surface orientations. The number of crystalline growth sites and therefore the extent of crystallinity is known to vary with the crystalographic orientation of the aluminum substrate since the crystalline anodic oxide grows by transformation rather than by direct deposition.

3. The presence of a small leakage current through the bulk of the substrate lying below the metallic or aluminum layer of the described oxide structure is found to be desirable in minimizing the effects of terrain hillocks and valleys. This leakage current avoids the occurrence of electrical stress concentrations during anodization—concentrations which lead to oxide electrical breakdown. The ensuing growth of oxide during anodization decreases the voltage gradient at the oxide hillock and valley sites.

4. The use of a relatively low pH in the anodizing electrolyte is found to be desirable in attaining good electrical properties for the anodization oxide. pH values in the range of 5 to 5.4 have been found to be desirable. Anodizing current density is found to be extremely sensitive to the electrolyte pH value. pH values above the range of 5-5.4 results in an increased current density and promote the formation of small clear domes on the surface of the anodization oxide. Such domes cause a decrease in anodizing field gradient and lower current density in the surrounding area and, thereby, promote the formation of polycrystallinity-sites of inferior electrical properties.

5. Anodic oxide films grown in an electrolyte bath having higher ion concentration contain more electrolyte by-products and exhibit better dielectric properties. The presence of electrolyte by-products in barrier anodic films is found to be potentially beneficial in regard to their performance as dielectrics because the by-products tend to retard the formation of partially polycrystalline aluminum oxide.

6. Anodization in colder temperature electrolytes produces superior dielectric films. The temperature range of 5° C. to 10° C. is found desirable for the present dielectric oxide growth and for minimizing the rate of growth of crystalline sites in the oxide.

7. Maintenance of the anodizing current density within predetermined limits has been discussed in some detail above. Both the use of constant current densities and rates of current density change which fluctuate are found to promote the formation of undesirable polycrystalline oxide.

8. Prolonged anodization during the hard anodizing sequence causes hard oxide films to thicken into a porous structure similar to that of the porous film formed in aggressive electrolytes. Pore colonies are observed to form at both the oxide-electrolyte and the oxide-metal interfaces under such conditions. Prolonged anodization is found to promote the growth of polycrystalline sites of inferior electrical performance as well as promoting the formation of short circuit ruptures in the formed oxide film. The anodization termination arrangement described herein is especially useful in avoiding these undesirable effects of excessive anodization.

9. Close control of heat treatment time and temperature is found to be necessary in avoiding the formation of hillocks—hillocks which may push through an overlaying oxide film and cause electrical failure. In the avoidance of hillock formation, the use of baking temperature not exceeding the substrate temperature during original aluminum deposition is also necessary.

10. The beneficial effect of high purity aluminum, purities better than 99.99% has been indicated herein. The improvement between 99.99% and 99.99%, for example, is noted to have a significant beneficial effect on the resulting anodization aluminum oxide.

The aluminum oxide in the above examples is formed by sputtering on to metallic films which overlay a silicon dioxide or other semiconductor substrate member. While certain advantages including a desirable small current flow through the substrate attend such semiconductor substrate usage, other substrate arrangements including insulating and conducting substrates are within the spirit of the invention. Formation of the anodic oxide on metallic substrates obtained by other than sputtering is similarly within the purview of the invention. The soft/hard anodization of aluminum is capable of producing alumina with a wide range of thickness while maintaining the dielectric appearance of amorphous hard oxide. The anodization procedure itself includes the elimination of constant current density anodizing during the hard anodization. This leads to reduction and elimination in the formation of the dielectrically weaker polycrystalline $Al^2O^3$. The achieved oxide films are able to withstand very high electric fields, show increased relative permittivity and have desirable high frequency performance. Densification of a previously formed soft oxide during a hard anodization can be controlled to produce films that range from almost purely soft oxide to almost purely hard oxide.

Conclusions

The oxide formation arrangement described herein is, therefore, capable of providing significantly improved oxide materials which are especially useful in high energy density light weight capacitors of the energy storing type. Although the invention has been disclosed in connection with aluminum oxide film, persons skilled in the art will recognize the applicability of the concepts recited to tantalum and other oxide film forming materials.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. A method for forming a film of dielectric of oxide on a metallic aluminum surface comprising the steps of:
    forming on said metallic aluminum surface a first electrolyte anodization layer of honeycomb structured porous soft aluminum oxide material
    transforming honeycomb structured porous soft aluminum oxide material in said first layer into a dielectric hard oxide in an acidic electrolyte at predetermined values of temperature, and at constant anodizing voltage, to the point of attaining a predetermined non zero time rate of change of anodizing current.

2. The method of claim 1 wherein said acidic electrolyte includes boric acid.

3. The method of claim 1 wherein said acidic electrolyte includes boric acid and is pH-adjusted to a predetermined value with ammonium hydroxide.

4. The method of claim 3 wherein said electrolyte also includes a free water limiting agent.

5. The method of claim 4 wherein said electrolyte free water limiting agent includes ethylene glycol.

6. The method of claim 1 wherein said aluminum surface is formed by sputtering metallic aluminum onto a substrate member.

7. Hard aluminum anodizing apparatus comprising the combination of:
   anodizing means including a constant temperature acidic bath of predetermined controlled pH for transforming soft porous aluminum oxide on a workpiece into a layer of dielectric hard aluminum oxide on said workpiece received in said bath;
   means connected with said workpiece for energizing said anodizing means with constant electrical voltage of predetermined magnitude;
   means responsive to the anodizing current flow generated by said means for energizing for terminating the anodizing of said workpiece in response to a predetermined non zero anodizing current flow criteria.

8. The apparatus of claim 7 wherein said predetermined current flow criteria includes a region of monotonically decreasing current flow and excludes a region of current fluctuation.

9. The apparatus of claim 8 wherein said current flow criteria comprises current decrease to a predetermined rate of change.

10. The apparatus of claim 9 wherein said means for energizing said anodizing means with constant electrical voltage includes means for stepping said electrical voltage to successively greater magnitudes during the energizing of said anodizing means.

11. A method for disposing an aluminum oxide electrical insulation layer of dielectric breakdown capability exceeding the oxide formation voltage on a silicon substrate supported sputtered metallic aluminum film comprising the steps of:
   forming on said silicon substrate supported sputtered metallic aluminum film a first electrolytic anodization layer of porous soft aluminum oxide, said forming step including soft anodizing in sulfuric acid electrolyte maintained at a temperature of six degrees celsius and a constant anodizing current density per square centimeter of aluminum film surface;
   hard anodize transforming at least a portion of said porous soft aluminum oxide to a harder layer of anodizing in an ethylene glycol diluted, pH of six, boric acid and ammonium hydroxide electrolyte solution using a three hundred volt constant anodizing voltage, and continuing the hard anodizing until the anodizing current rate of change falls below 0.4 milliamperes per minute.

12. The method of claim 11 wherein said electrolyte solution is diluted one to twenty with said ethylene glycol.

13. The electrical insulation formed by the process of claim 12.

14. Aluminum anodizing apparatus comprising the combination of:
   means including a first constant temperature acidic electrolyte bath for forming, on a smooth aluminum surface, a first thin layer of hard aluminum oxide and a thicker second layer of porous soft aluminum oxide covering said thin initial hard oxide layer;
   means including a second, constant temperature acidic anodizing electrolyte bath, for transforming a portion of said second thicker layer of porous soft aluminum oxide into a denser harder dielectric aluminum oxide and for also increasing the thickness of said first thin layer of hard aluminum oxide.

15. The apparatus of claim 14 wherein said second, transforming, anodization is energized at constant anodizing voltage.

16. The apparatus of claim 15 further including means for sensing the anodizing current flow in said second transforming bath and for terminating said transforming at a predetermined non zero anodizing current.

17. The apparatus of claim 16 wherein said predetermined current characteristic point excludes a predetermined region of transforming anodizing current fluctuation.

18. The apparatus of claim 17 wherein said means for sensing and terminating is responsive to decrease in said anodizing current to a predetermined rate of change level.

19. The apparatus of claim 18 further including:
   a sulfuric acid constituent in said first acidic electrolyte bath;
   means for maintaining said first electrolyte bath anodizing current at a constant amplitude;
   a boric acid constituent in said second acidic electrolyte bath;
   an ethylene glycol free water limiting agent constituent in said second acidic electrolyte bath; and
   means for maintaining said first and second electrolyte baths at the temperature of six degrees centigrade.

20. The apparatus of claim 14 wherein said means including a second, constant temperature acidic anodizing electrolyte bath also includes means for applying a stepped voltage having intervals of successively greater voltage magnitude during said transforming of soft aluminum oxide into a denser harder aluminum oxide and said increasing of hard aluminum oxide thickness.

21. The electrical insulation formed by the process of:
   forming, on a smooth planar surface of an anodizable metal film and in a first acidic electrolyte bath, a first electrolytic anodization layer of porous soft metallic oxide covering a surface of said anodizable metal film;
   converting at least a portion of said first anodization layer porous soft metallic oxide into a denser and harder barrier form of metal oxide by anodizing in a second acidic electrolyte bath at constant anodizing voltage and with anodizing termination in response to a predetermined non zero decreasing anodizing current criteria.

22. The insulation of claim 21 wherein said anodizing current has a time domain waveform which includes a first region of smoothly decreasing current amplitude and a second later in time region of fluctuating current amplitude and wherein said "predetermined decreasing anodizing current criteria comprises" a current magnitude within said first region of smoothly decreasing amplitude that is also prior in time to the onset of said second region of current amplitude fluctuation.

23. A method for forming a high dielectric strength electrical insulation layer over a supporting electrical conductor comprising the steps of:
   disposing high purity anodizable metal onto the form of a substrate supported and planar surfaced metallic film;
   forming, in a first acidic electrolyte bath, a first electrolyte anodization layer of porous soft metallic oxide and a thinner initial hard oxide layer, said thinner hard oxide layer being disposed below said porous soft metallic oxide and located proximate the surface of said anodizing metal film;

transforming at least a portion of said first anodization layer porous soft metallic oxide into a denser and harder barrier form of metal oxide by anodizing in a second acidic electrolyte bath;

whereby electrical insulation of superior dielectric strength and minimal electrical fault site count are attainable.

24. The method of claim 23 wherein said anodizing in said transforming step includes a constant voltage anodizing sequence.

25. The method of claim 24 wherein said constant voltage anodizing sequence includes terminating said anodizing upon attainment of a predetermined time rate of change of finite but decreasing anodizing current.

26. The method of claim 23 wherein said anodizable metal is aluminum.

27. The method of claim 26 wherein said second electrolyte bath includes a free water limiting component.

28. The method of claim 27 wherein said free water limiting component includes ethylene glycol.

29. The method of claim 28 wherein said second electrolyte includes ammonium hydroxide as a pH level adjusting element.

30. The method of claim 27 wherein said first and second electrolyte baths are maintained within the temperature range of zero to fifteen degrees centigrade during said forming and transforming steps.

31. The method of claim 30 further including the step of baking said electrical insulation layers according to a predetermined schedule of time and temperatures following said forming and transforming steps.

32. The method of claim 31 wherein said aluminum includes less than two percent of impurities.

33. The method of claim 32 wherein said aluminum includes one percent of silicon.

34. The method of claim 32 wherein said disposing step includes depositing said aluminum on a semiconductor substrate member.

35. The method of claim 34 wherein said disposing step includes sputtering said aluminum onto the oxidized surface of a silicon substrate member.

36. The method of claim 35 wherein said second electrolyte includes boric acid.

37. The method of claim 36 wherein said first electrolyte includes sulfuric acid.

38. The method of claim 25 wherein said predetermined time rate of change of anodizing current is 0.025 milliampere per centimeter squared of anodizable metal surface area per minute.

39. The method of claim 29 wherein second electrolyte has a pH value of 5.0.

40. The method of claim 32 wherein said forming step includes anodizing at a predetermined constant current.

41. The method of claim 32 wherein said constant current has a magnitude of 1.5 milliamps per centimeter squared of metal surface area.

42. The method of claim 30 wherein said electrolyte baths are maintained within the temperature range of five to six degrees celsius.

43. The method of claim 23 wherein said transforming step includes an anodizing current waveform having a rise time of less than 500 milliseconds to a magnitude above the current range of polycrystalline metal oxide formation.

44. The method of claim 43 wherein said current waveform includes a fall toward zero current from a current magnitude that is changing at a predetermined time rate and is also above said current range of polycrystalline metal oxide formation.

45. The method of claim 23 wherein said transforming commences in the region of said porous soft metallic oxide proximate said metallic film surface and proceeds outward therefrom toward the surface of said porous soft oxide.

46. The method of claim 23 wherein said transforming step includes a current waveform having a fall toward zero current immediately preceeding a predetermined waveform region of current fluctuation.

47. The method of claim 23 wherein said transforming step also includes increasing the thickness of said initial hard oxide layer.

48. The method of claim 23 wherein said transforming step includes anodizing with stepwise incremented successively larger magnitudes of constant anodizing voltage.

49. A method for generating improved aluminum anodization oxide, having a smaller number of islands of impaired electrical insulation capability and having dielectric strength in excess of the anodizing potential and electrical uniformity on a metallic surface comprising the step of:

commencing the anodization with a smooth and clean metallic aluminum surface;

forming a film of soft porous oxide on the aluminum surface;

transforming at least a portion of soft porous film into hard barrier oxide, said transforming including;

generating the hard barrier oxide in an acidic electrolyte solution of predetermined pH;

controlling the temperature of the anodizing bath within a predetermined band of temperature residing in the range of zero to fifteen degrees centigrade;

maintaining the anodizing voltage at a constant predetermined magnitude;

terminating the anodization at a predetermined point of finite but decreasing current on the waveform of anodizing current versus anodizing time.

50. The method of claim 49 wherein said anodizing current waveform includes an initial region of rapid current increase and a region of substantially constant current followed by said region of decreasing current.

51. The method of claim 50 wherein said anodizing current waveform further includes a region of increasing and decreasing current amplitude fluctuation subsequent to said region of decreasing current and wherein said predetermined waveform point excludes said waveform region of increasing and decreasing current amplitude fluctuation.

52. The method of claim 51 wherein said predetermined waveform point is a point of predetermined rate of change of current per unit anodizing area with time.

53. The method of claim 52 wherein said predetermined rate of change of current per unit area with time is 0.025 milliamperes per square centimeter per minute.

54. The method of claim 49 wherein said electrolyte solution has a pH in the range of 5.0 to 5.4.

55. The method of claim 54 wherein said electrolyte solution has a pH of 5.2.

56. The method of claim 49 wherein said hard anodizing electrolyte solution also includes a free water limiting component.

57. The method of claim 56 wherein said free water limiting component is ethylene glycol.

58. The method of claim 49 further including baking said anodizing oxide in accordance with a predetermined schedule of time and temperature following anodizing.

* * * * *

UNITED STATES PATENT AND TRADEMARK OFFICE
CERTIFICATE OF CORRECTION

PATENT NO. : 4,936,957
DATED : June 26, 1990
INVENTOR(S) : John R. Dickey et al

It is certified that error appears in the above-identified patent and that said Letters Patent is hereby corrected as shown below:

Col 3, line 12, before "of" ---oxide--- should be inserted.
Col 3, line 60, "two views identified" should read
    ---two views - views identified---.

Col 4, line 33, "block 112," should read ---block 112---.
Col 6, line 37, after "possible" ---however--- should be inserted.
Col 8, line 58, "factors," should read ---factor S,---.
Col 8, line 59, "aluminum the" should read
    ---aluminum. The---.
Col 9, line 24, "Ratio" should read ---Radio---.
Col 9, line 41, after "instance" a comma should be inserted.
Col 9, line 55, "e.g. value" should read --- e.g. a value---.
Col 14, line 29, "thickness less" should read
    ---thickness of less---.

UNITED STATES PATENT AND TRADEMARK OFFICE
CERTIFICATE OF CORRECTION

PATENT NO. : 4,936,957

DATED : June 26, 1990

INVENTOR(S) : John R. Dickey et al

It is certified that error appears in the above-identified patent and that said Letters Patent is hereby corrected as shown below:

Col 15, line 66, "99.99%, for" should read ---99.999%, for---.

Signed and Sealed this

First Day of September, 1992

Attest:

DOUGLAS B. COMER

*Attesting Officer*  *Acting Commissioner of Patents and Trademarks*